May 19, 1953 R. L. HARVEY 2,639,324

TUNED INDUCTIVE COUPLING SYSTEM

Filed April 29, 1948

INVENTOR
Robert L. Harvey
BY Morris L. Rabkin
ATTORNEY

Patented May 19, 1953 2,639,324

UNITED STATES PATENT OFFICE 2,639,324

TUNED INDUCTIVE COUPLING SYSTEM

Robert L. Harvey, Princeton, N. J., assignor to Radio Corporation of America, a corporation of Delaware Application April 29, 1948, Serial No. 24,001

16 Claims. (Cl. 178—44)

Figure 1:
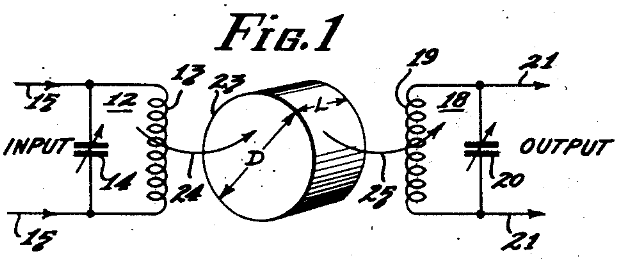

The present invention relates to tuned inductive coupling systems, and more particularly to tuned inductive coupling systems for relatively high frequency signals, and has for its primary object to provide an improved and simplified tuned coupling system of the character referred to, which embodies a resonant ceramic tuning element and which is adapted for use in relatively high frequency filter elements, frequency stabilizing circuits, wave trap and rejector circuits, high intermediate frequency amplifiers, and in other high frequency apparatus where a fixed frequency tuned circuit is desired.

It is a further object of the invention to provide an improved tuned electrical circuit comprising a high dielectric constant, ceramic body as a resonating element therein, and inductive coupling means for one or more of such bodies for the transfer or absorption of high frequency energy at predetermined frequencies.

In accordance with the invention, relatively small bodies of high dielectric-constant ceramic material having predetermined dimensions and shape are effectively utilized for direct inductive coupling with tuned high frequency electrical circuits as complete inductive resonating devices at fixed frequencies predetermined by such dimensions and shape.

It has been found that poly-crystalline barium titanate ($BaTiO_3$) and compositions of barium and strontium titanate $(Ba/Sr)TiO_3$ in predetermined proportions, such as 70 per cent barium titanate and 30 per cent strontium titanate, formed in a molded body of cylindrical or rectangular configuration, may be brought into close coupling relation with the inductive element of any high frequency tuned circuit as a resonant coupling element therefor with other tuned circuits, or as a selectivity control means for the circuit with which it is coupled. Such bodies have all the properties of a resonant circuit consisting of an inductance and a capacitance, and exhibit different resonant frequencies, one for each principal dimension of any face of the ceramic body.

It has been found that barium and strontium titanate compositions may have a dielectric constant $k$ of the order of from one thousand to eight thousand or more, depending upon the composition, and the relative proportions of the barium and strontium titanate, an increase in the strontium titanate material tending to raise the dielectric constant. A body of such material, while exhibiting high efficiency in a matter of coupling inductively with tuned circuits and having a definite frequency response or a plurality of definite frequency responses depending upon the shape and configuration, exhibits no capacity coupling ability with any high frequency or other electrical circuit when brought into close spaced relation thereto, except through the application to such body of electrodes on opposite sides of a thin section thereof, and said body appears to operate as a capacitor dielectric. In other words, coupling to a free body of high dielectric titanate ceramic material can only be made by inductive or magnetic means. From a capacity standpoint it is perfectly symmetrical and does not exhibit a capacitance potential.

It is, therefore, a further object of this invention, to provide an improved tuned inductive coupling system for high frequency signal circuits and the like, embodying a controlling inductive element in association with other inductive elements, which comprises a body of poly-crystalline titanate ceramic material having a high dielectric constant and predetermined configuration and dimensions, for resonating at desired frequencies with respect to circuits with which it may be coupled.

It is also an object of this invention, to provide an effective tuned electrical circuit consisting entirely of a ceramic body having a relatively high dielectric constant ($k$).

It is a further and more specific object of this invention to provide an effective tuned electrical circuit consisting entirely of a ceramic body having a relatively high dielectric constant ($k$), and which is movable to provide variable selectivity and for frequency selection in a signal energy conveying system.

It is an object of this invention, furthermore, to provide a tuned circuit high frequency energy conveying system comprising a resonant ceramic body which is resonant at more than one frequency and which is responsive to inductive coupling only, from an external circuit, when properly oriented with respect thereto.

Bodies of ceramic material of the high dielectric constant titanate type have generally been found to be best suited for coupling purposes when either cylindrical or rectangular. In any case, definite faces must be provided for inductive coupling, and resonance at definite frequencies. When all dimensions of the body are alike, the body of high dielectric ceramic material has a single frequency response. As an inductive coupling element, it has all of the characteristics of a tuned circuit, having null and maximum positions as it is rotated or otherwise oriented in close inductive coupling relation to the inductance of a tuned circuit or an exciting inductance, for conveying high frequency energy thereto at a frequency determined by its boundary dimensions.

Accordingly, it is a still further object of this invention, to provide an improved high frequency tuned inductance coupling system embodying one or more movable or rotatable bodies of high dielectric titanate ceramic material for varying the inductive coupling with one or more high frequency circuits.

It has been found that high dielectric titanate ceramic bodies may resonate at relatively high frequencies in a range above one hundred megacycles, for example, when all dimensions are maintained of the order of less than two inches and when the dielectric constant, for example, is of the order of five thousand. For this reason the coupling system of the present invention is particularly well adapted for use in television and other high frequency and intermediate frequency amplifiers and other circuits.

The invention will, however, be further understood from the following description, when considered in connection with the accompanying drawing, and its scope will be pointed out in the appended claims.

Figure 2:
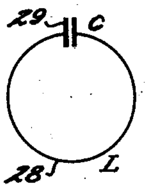
Figure 3:
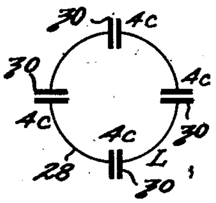
Figure 4:
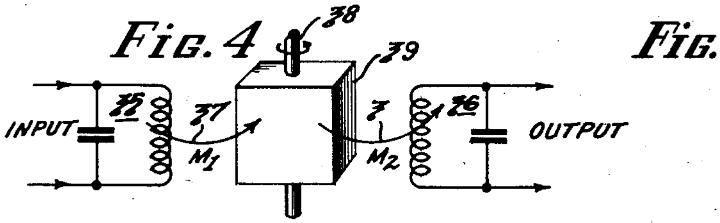
Figure 5:
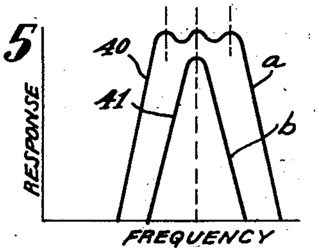
Figure 6:
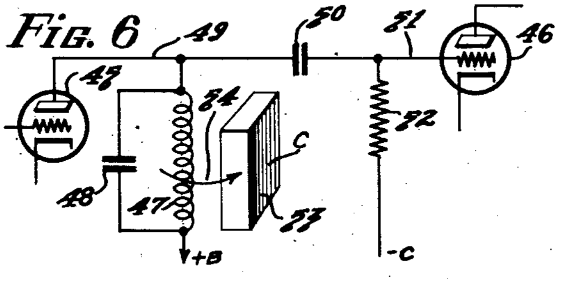
Figure 7:
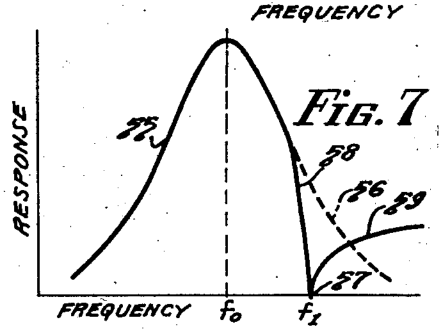
Figure 8:
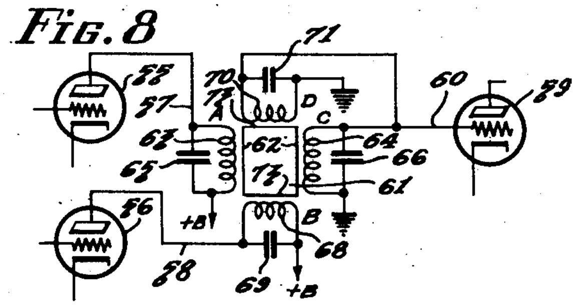
Figure 9:
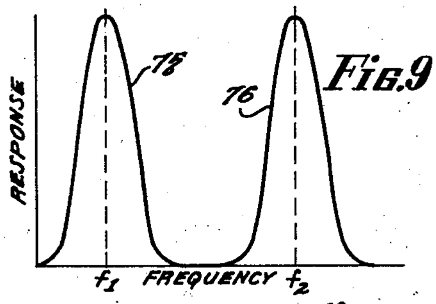
Figure 10:
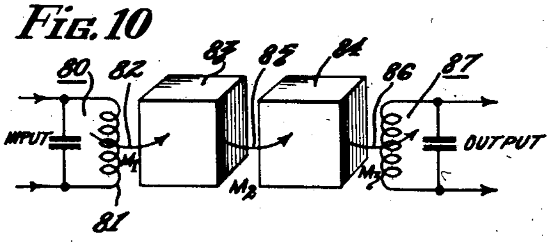
Figure 11:
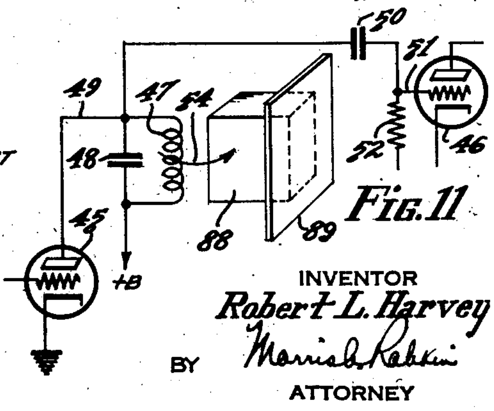

In the drawing:

Figure 1 is a schematic circuit diagram of a tuned inductive coupling system embodying the invention, Figures 2 and 3 are schematic circuit diagrams illustrating an operating characteristic of the system of Figure 1 and of the invention, Figures 4, 6 and 8 are schematic circuit diagrams of tuned inductive coupling systems embodying the invention in various forms, being modifications of the coupling system of Figure 1, Figures 5, 7 and 9 are graphs showing curves illustrating certain frequency response characteristics of the modifications of the invention shown in Figures 4, 6 and 8, respectively, and Figures 10 and 11 are further schematic circuit diagrams showing additional modifications of the invention as applied to various tuned inductive coupling system for high frequency signals and the like.

Referring to Figure 1, a tuned signal input circuit 12 comprising an inductance element 13 and a shunt connected capacitor 14 are provided with signal input leads 15 and may be considered as the tuned input circuit for an intermediate frequency signal conveying system operating at a relatively high frequency above one hundred megacycles, for example.

The circuit 12 is arranged to be inductively coupled to a second tuned circuit 18 comprising a similar tuning inductance 19 provided with a shunt tuning capacitor 20 and having signal output leads 21 for connection with any utilization device (not shown). The tuning capacitors 14 and 20 may be adjusted so that both circuits 12 and 18 are responsive to the same frequency.

It has been found that when a body of high dielectric titanate ceramic material is introduced between the circuits 12 and 18 and is brought into inductive coupling relation with both the input inductance 13 and the output inductance 19, it acts to couple the circuits to a degree dependent upon the shape and dimensions of the faces presented for coupling, and, when properly oriented, as effectively as if the circuits were directly inductively coupled through a similar association of the inductances 13 and 19.

In the present example, a cylindrical body of titanate ceramic material of high dielectric constant is indicated at 23 having a diameter D and a length L to give it predetermined desired frequency response or resonance characteristics according to the length of the boundary of each face, as determined by the length of D and L. The inductive coupling between the input inductance 13 and the body is indicated by the curved arrow line 24 and the inductive coupling between the ceramic body and the output inductance 19 is indicated by the curved arrow line 25.

When oriented to provide the diameter or circumferential length as the frequency controlling dimension in the coupling system, the body responds to or resonates at one frequency, and when oriented to provide the overall axial length, 2(L+D), as the frequency controlling element, the body responds at a second frequency, and in either case may operate as the coupling element between the circuits. It has been found that a ceramic body of the shape shown in Figure 1 will exhibit resonance characteristics as indicated below:

| Body | Dia., Inches | Length | K | Resonance | |
|---|---|---|---|---|---|
| | | | | Dia., MC. | Length, MC. |
| Sample X | 1 | 1⅛ | 5,000 | 310 | 350 |
| Sample Y | 2 | 1¾ | 5,000 | 113 | 123 |

It will be noted that for each body, two resonance frequencies are found, one with respect to the diameter or circumference of each and one for the length, that is, the length about the body, or 2(L+D).

When so operated as a coupling element in a tuned resonant system as indicated in Figure 1, it will be seen that if the circuits 12 and 18 are tuned to 310 megacycles, the diameter or end coupling with the sample X above, having the dielectric constant of five thousand, will provide for the transfer of energy from one tuned circuit to the other at that frequency, and the body operates as a tuned electrical circuit entirely devoid of metallic coupling members. In operation, furthermore, it has been found that such transfer is without appreciable loss and that a highly efficient inductive or magnetic coupling is provided which aids appreciably in reducing the capacity coupling between the circuits 12 and 18, since the dielectric or ceramic body is not affected by capacity coupling.

Referring now to Figures 2 and 3 along with Figure 1, the coupling effect provided by such high dielectric constant ceramic bodies appears to be based upon the fact that if an inductance or wire 28 is connected at its ends to a tuning capacitor 29, the LC combination provided will have a definite resonant frequency. If now the inductance or wire 28 is broken at four equally spaced points and capacitors 30 are inserted therein, the circuit will still have the same resonance frequency if the capacitors are of a value four times the original value of the capacitor 29. The resonant ceramic body operates as if it were composed of an infinite number of such capacitors both in series and parallel, with a number of conducting paths associated therewith and all of the capacitors being of relatively high value.

The ability to provide inductive coupling only with associated objects or circuit elements, while as a capacity element it is perfectly symmetrical and does not exhibit any capacity characteristic for coupling with other associated circuit elements, is a desirable characteristic of titanate ceramic resonators in accordance with the invention. Furthermore, a ceramic resonator provided in accordance with the invention, has been found to have null and maximum positions of coupling as it is rotated, and the four "Hazeltine Angles" may be found as it is rotated about a radiating coil such as the inductance coil 13. The Q of such tuned ceramic resonators may be of the order of 200 or higher.

From the foregoing consideration of Figures 1, 2 and 3, it will be seen that if a high dielectric ceramic body of titanate or strontium titanate is of cylindrical shape as shown, it will have two resonance frequencies, one determined by the dielectric constant and the effective diameter or circular dimension, and the other resonance frequency being determined by the dielectric constant and the effective dimension which is at a right angle to the first dimension.

In the circuit of Figure 1, the body of ceramic material is used as an inductive coupling element between two tuned circuits. It acts like a third tuned circuit, and the overall response curve or frequency response characteristic may have a single peak or three peaks depending upon the degree of coupling to the tuned circuits, in the well known manner for any three tuned, inductively-coupled circuits arranged as shown in Figure 1. This is shown more fully in connection with Figures 4 and 5, to which attention is now directed.

Referring now to Figures 4 and 5, two tuned circuits 35 and 36 are shown in inductive coupling relation to a rectangular block or body of high dielectric ceramic material 39, the inductive coupling being indicated by the curved arrow lines 37 and 38. In this modification of the invention, the block of ceramic material is rotatable about a vertical pivot axis provided by a shaft 38 on which it is mounted. As will be observed from the figure, the ceramic body has six rectangular faces in parallel pairs and therefore has several different dimensions. It is so mounted that it presents different faces to the tuned circuits as it is rotated. The dimensions of the ceramic body are such that one face may be presented to the tuned circuit 35 to cause resonance of the ceramic body at the frequency of the tuned circuit.

The tuned circuit 36 is in inductive coupling relation to an opposite and similar face and is tuned to the same frequency as the circuit 35 so that the transfer of energy at that frequency is provided with a high degree of coupling efficiency. As the ceramic coupling body is rotated, this resonance is no longer coupled to the tuned circuit and thus the coupling may be varied. However, when the body is rotated so that full coupling is provided through the body of ceramic material, a three-peaked response curve, indicated at 40 in Figure 5, may be provided having a relatively wide selective characteristic but with relatively steep sides as is desirable. A band pass effect is thus provided. This also provides a high gain and low selectivity characteristic for the signal transmission system. The variable coupling control effect may be provided in any inductive coupling system by providing a rotatable and resonant body of high dielectric ceramic material as shown, whereby the selectivity, fidelity, and gain of the system may be altered in any desired manner depending upon the shape and size of the ceramic body. In the present example, as the ceramic body is rotated further so as to be de-coupled at the resonance frequency of the circuits 35 and 36, the sharply peaked response curve indicated at 41 in Figure 5 may be provided. This arrangement, therefore, provides a variable selectivity of fidelity system which is highly desirable in certain intermediate frequency amplifier circuits and the like.

It may here be pointed out that if the ceramic body is of cube shape but not a perfect cube, there will be three resonance frequencies, one for each effective dimension or face. However, if the body is a perfect cube, the three frequencies will be coincident and only one frequency response or resonance frequency will be found. It will seem, therefore, that bodies of high dielectric ceramic material may have any number of resonance frequencies by providing any number of spaced faces thereon.

Referring now to Figures 6 and 7, a high frequency amplifier circuit is shown in Figure 6, between a first stage amplifier tube 45 and a second stage amplifier tube 46. The tuned coupling arrangement comprises a tuning inductance 47 provided with a shunt tuning capacitor 48 connected as a single tuned circuit in connection with the output anode circuit 49 of the tube 45. The anode end of the tuned circuit provided by the capacitor and the inductance is coupled through a suitable coupling capacitor 50 with the grid circuit 51 of the amplifier tube 46, and the grid circuit includes a resistor type of coupling impedance indicated at 52.

In connection with this circuit, a rectangular body of high dielectric titanate ceramic material 53 is inductively coupled to the tuning inductance 47 as indicated by the arrowed coupling line 54. The frequency response of the coupling circuit, without the body of ceramic material, is indicated by the response curve 55 shown in Figure 7 including the dotted portion 56, for a frequency $f_0$. When the ceramic body 53 is brought into close coupling relation with the inductance 47, the resonance curve or response characteristic 55 may be modified to provide a sharp cutoff point 57 at a frequency $f_1$ as shown, so that the response characteristic is provided with a sharp cutoff slope 58 and a relatively low response 59 on the high frequency side of the cutoff point 57.

The ceramic face presented to the inductance 47 for inductive coupling therewith is provided with dimensions, that is, an overall peripheral length, which causes resonance at the frequency $f_1$, so that an absorption of energy will take place at that frequency and the resonance curve may thereby be altered as shown by the solid lines 58—59 on opposite sides of the rejection point 57. It is obvious that a similar rejection point may be provided on the opposite side of resonance by coupling a second ceramic body, or another face of the body 53, to the inductance, to provide a frequency response lower than resonance by any desired amount, thereby to provide signal rejection on opposite sides of resonance and a high degree of selectivity in the signal transmission characteristic of the amplifier circuit. With any similar arrangement of this character, it will be seen that the system may operate as a filter, wave trap, or rejector as desired for one or more frequencies off resonance, and the ceramic coupling bodies may be movable or rotatable as in Figure 4 for varying the coupling effect or the frequency response.

Referring now to Figures 8 and 9, two signal amplifier tubes 55 and 56, representing two distinct signal channels, are provided with signal output circuits 57 and 58 respectively, which in accordance with the invention may be coupled jointly at two different frequencies to a single signal amplifying channel represented by the amplifier tube 59, which is provided with a single input grid circuit 60. Coupling is provided through the medium of a titanate ceramic body having two differing dimensions or faces and preferably of rectangular form as indicated at 61. Two opposite faces 62 are utilized to couple an inductance element 63 in the anode or output circuit 57 with a tuning inductance 64 in the grid circuit 60 of the amplifier tube 59, the inductances being provided respectively with shunt tuning capacitors 65 and 66 respectively for tuning the two circuits to the same frequency. Likewise the dimensions of the faces 62 of the ceramic coupling element 61 are made such that the length around each face provides resonance at the same frequency.

Also connected in the anode circuit 58 is a second output tuning inductance 68 having a shunt tuning capacitor 69 which tunes the inductance 68 to a different frequency from that of the inductances 63 and 64. The corresponding inductance 70, connected with the grid circuit 60, is tuned by a shunt tuning capacitor 71 to the same frequency as that of the inductance 68. The two inductances 68 and 70 are coupled to two other opposite faces 73 of the coupling block 61 which are at a right angle to the faces 62, the faces 73 being of a different length or dimension from that of the faces 62 such that the block of ceramic material will also resonate at the frequency to which the inductances 68 and 70 are tuned.

With this arrangement, two signals at different frequencies may be transmitted through the coupling body 61, from the two signal channels represented by the tubes 55 and 56, to the single channel represented by the tube 59. The response of the signal channel 55—59 is indicated by the selectivity or response curve 75 in Figure 9, while the frequency response of the signal channel 56—59 is indicated by the response curve 76. It will thus be seen that the two channels resonate at different frequencies $f_1$ and $f_2$ as indicated, and that the response may be relatively sharp in each channel, whereby the two different frequency signals may be transmitted simultaneously without interference.

The circuit thus provides a double frequency transformer where the circuits A and C for the coupling coils 63—64, and the ceramic body or coupling block 61 constitute one resonant system, and the circuits B and D for the coupling inductances 68 and 70, and the ceramic coupling block 61 compose the other resonant system. The ceramic block is equally dimensioned on opposite faces so that it has two resonances at the desired frequencies, and is located with respect to the coils substantially as indicated, so that proper coupling is obtained. The system shown is of particular value in double frequency intermediate frequency amplifiers and the like.

Referring now to Figure 10, a coupling system is shown wherein more than one ceramic coupling element or block is employed. In this system, a tuned input circuit 80, having a tuned coupling inductance 81 is inductively coupled as indicated by the arrowed coupling line 82, with a rectangular block 83 of titanate ceramic material, the dimensions of which are such that the face presented to the coupling inductance 81 causes resonance of the block at the same frequency as the circuit 80.

A second block of titanate ceramic material 84 of the same dimensions and having similar faces is presented in coupling relation to the opposite face of the block 83 as indicated, to provide inductive coupling indicated by the curve arrowed line 85, and resonates at the same frequency. The corresponding opposite face of the block 84 is, in turn, inductively coupled to an output tuning inductance 86 for a tuned output circuit 87, also responsive to the same frequency.

It has been found that with this arrangement, transfer of energy may be obtained by the widely separated circuits such as 80 and 87 having substantially no inductive or electro-static coupling between them, with a high degree of inductive coupling, when the blocks 83 and 84 are properly oriented and coupled to effect full energy transfer. Furthermore, the frequency response characteristic may, by this means, be made relatively wide and flat-topped or with a slightly peaked flat top corresponding to the four resonant elements, somewhat after the manner of the curve 40 of Figure 5. The flatness of the response is a function of the coupling between the various elements as is well known for coupling circuits. Band width control may further be provided through the use of a high loss ceramic in certain cases together with adjustment of coupling, thereby to broaden and lower the flat top of the response curve 40.

The circuit of Figure 10 provides a transformer or filter having a high degree of energy transfer efficiency and with a minimum of electro-static and inductive coupling directly between the circuits 80 and 87. This is a particularly desirable arrangement for ultra high frequency circuits which operate in frequency ranges of the order of one hundred to one thousand megacycles, for which the titanate ceramic coupling system of the present invention is particularly well adapted.

Wherever it is desirable to modify the frequency response of a titanate ceramic coupling block or body, it has been found that the presence of a metallic or other conducting plate when placed against or near a face of the ceramic body or block which is nearest or directly opposite from the tuned circuit, an increase in the resonant frequency of the ceramic may be obtained. The magnetic flux in the conducting body or plate appears to produce currents in the conducting plate which reduce the apparent inductance of the ceramic body, thereby increasing its frequency response.

An example of an arrangement providing this controlling effect upon the ceramic controlling element or block is shown in Figure 11, to which attention is now directed. The circuit of Figure 11 is the same as that of Figure 6 and embodies the same coupling elements which bear like reference numerals. The circuit is thus an absorption circuit having a frequency response as shown in Figure 7.

In the present modification, a block of ceramic titanate material 88 is provided of substantially equal dimensions throughout and with one face coupled to the tuning inductance 47, while the opposite face is coupled to a plate 89 of conducting material such as brass or copper, which is moved into close coupling relation or contact therewith. This permits full coupling with the inductance 47 while at the same time providing the controlling effect above referred to. The operation is such that the cutoff frequency $f_1$ (Figure 7) may be shifted slightly away from the main resonant frequency $f_0$ as the plate is moved toward the block of ceramic material and toward the main resonant frequency $f_0$ as the plate is moved away from the block. In other words, the frequency $f_0$ may be shifted slightly upwardly in frequency by this means. In one embodiment of the invention as shown in Figure 11, the resonant frequency has been changed from 123 to 130 megacycles by use of a brass plate as shown.

Because of the non-uniformity of barium and strontium titanates as now produced by known methods of manufacture, the composition may vary slightly throughout any given mass, and in large bodies may cause the mass to have a lower dielectric constant than may be determined by mathematical analysis. However, generally the following formula for resonance may be assumed for properly homogeneous and uniformly poly-crystalline barium titanate ceramics and barium-strontium titanate ceramics which may be used for inductive coupling bodies in high frequency circuit networks and amplifier systems after the manner hereinbefore described.

This formula for resonance is:

$$f=\frac{c}{2\pi\sqrt{K}}\sqrt{\frac{4\pi^2}{\lambda_g^2}+\frac{\pi^2}{b^2}}$$

where $f$=frequency in cycles per second,
$k$=dielectric constant of ceramic,
$c$=velocity of light $= 3\times10^{10}$ cm. per second,
$\lambda g$=wavelength in guide or, $$\lambda g=\frac{2e}{n}$$

where $e$=length of sample in cm.,
$n$=a whole number, and
$b$=width of sample in cm.

It can be seen that there are several resonant frequencies of sufficient magnitude to be considered, where $n=1$, $n=2$, $n=3$, etc. In general these can be found by experimental data, but the fundamental frequency ($n=1$) is usually of the most interest.

Any suitable poly-crystalline titanate ceramic material may be used, such as compositions of barium titanate, $BaTiO_3$, or barium and strontium titanate, $(Ba/Sr)TiO_3$, in predetermined proportions to provide a relatively high dielectric constant $k$ of the order of from 1000 to 8000, for example, and higher.

Since barium and strontium titanate ceramics are poly-crystalline in character, no particular axis of cleavage or response must be considered in forming a block of material from any particular mass. The frequency response depends only upon the dimensions or total outside boundary or peripheral path length of a particular face of a body of material, when formed as a coupling element or unit block, for inductive coupling with the various inductance elements of high frequency tuned circuits and the like. The coupling characteristic is particularly useful between one hundred and one thousand megacycles at present, and therefore the system is of particular value in color television circuits and other high frequency amplifier and transmission circuits.

As will be seen from the foregoing description, the invention broadly relates to the use of a resonant ceramic material of poly-crystalline barium titanate or barium strontium titanate or other poly-crystalline ceramic material having similar characteristics, which may be responsive to the presence of magnetic flux, having the properties of a resonant circuit, whereby it may serve as a coupling element between or for tuned high frequency circuits to transfer or absorb high frequency energy, and as a variable-band transformer to control the energy transfer, while at the same time the coupling element or body is wholly ceramic and devoid of any metallic coupling element.

I claim as my invention:

1. In a signal energy conveying system, a tuned electrical circuit comprising a tuning inductance, a ceramic body having a relatively high dielectric constant and having two spaced substantially parallel faces for resonating at a predetermined frequency with one of said faces in inductive coupling relation to said tuning inductance, and a plate of conducting material positioned adjacent the other of said faces to modify the frequency response of said circuit and being movable to vary said frequency response between predetermined limits.

2. A tuned inductive coupling system for resonant electrical signal conveying circuits, comprising a tuning inductance in one of said circuits, and a body of titanate ceramic material dimensioned to resonate at the frequency of said circuit in inductively coupled relative to said inductance.

3. A tuned inductive coupling system for resonant electrical signal conveying circuits, comprising a tuning inductance in each of two of said circuits, and a body of titanate ceramic material in inductive coupling relation to and between said inductances and having dimensions for resonating at the frequencies of said circuits.

4. A tuned inductive coupling system as defined in claim 3 wherein a plurality of resonant titanate ceramic bodies are interposed between said tuning inductances, said bodies being in inductive relation to each other and having faces of substantially equal size presented for inductive coupling with said inductances and with each other, whereby the tuning inductances are wholly inductively coupled through said bodies of ceramic material and are provided with a minimum of capacity coupling.

5. In a tuned electrical circuit, the combination of a resonating element therein comprising a high dielectric constant ceramic body having size, configuration, and at least one coupling face dimensioned to resonate at a predetermined frequency, and inductive coupling means positioned adjacent said face in inductive coupling relation thereto for the transfer of high frequency energy thereto at said predetermined frequency.

6. In a tuned electrical circuit, the combination defined by claim 5, wherein the ceramic body comprises polycrystalline barium titanate having a dieelectric constant above one thousand.

7. In a tuned electrical circuit, the combination of a resonating element comprising a high dielectric constant ceramic body having at least two spaced substantially parallel and equal faces resonant at substantially the same frequency, and a pair of tuning inductances in inductive coupling relation each with one of said faces for the transfer of high frequency energy therethrough at a predetermined frequency.

8. In a tuned signal transmission system, the combination with a pair of spaced tuning inductances, of a relatively small body of high dielectric constant ceramic mtaerial having predetermined dimensions and shape in direct inductive coupling between and with said inductances, said body of ceramic material providing an inductive resonating coupling device responsive to at least one substantially fixed frequency predetermined by such dimensions and shape.

9. In a tuned signal transmission system, the combination defined by claim 8, wherein the body of ceramic material is of rectangular configuration and resonant at a frequency above one hundred megacycles.

10. In a tuned signal transmission system, the combination as defined in claim 8, wherein the body of ceramic material is movable relatively to said tuning inductances to provide a variation in coupling between said inductances.

11. A tuned inductive coupling system for high frequency signal circuits and the like comprising a plurality of inductive tuning elements in predetermined inductive coupling relation to each other, and a controlling inductive tuning element associated with said first named inductive tuning elements comprising a body of titanate ceramic material having a high dielectric constant and predetermined configuration and dimensions providing a plurality of spaced faces thereon and one of said faces being in inductive coupling relation with at least one of said first named inductive tuning elements for resonating at a predetermined frequency.

12. An electrical tuned circuit system for conveying high frequency energy consisting in part of a resonant ceramic body resonant at at least one frequency and having one or more inductive coupling faces one of said faces being inductively coupled with said system, said ceramic body being movable to inductively present another of said faces to said system to provide variable selectivity and coupling to control the flow of energy through said system.

13. A control coupling system for inductively coupling electrical signal conveying circuits comprising an inductive winding in at least one of said circuits and a ceramic body having a dielectric constant above one thousand and a tuned frequency response which is a function of the dimensions, configuration and orientation thereof in the field of said winding.

14. A control coupling system as defined in claim 13, in which the ceramic body comprises poly-crystalline barium titanate and compositions of barium strontium titanate in predetermined portions.

15. In a signal conveying system, the combination with an inductive signal conveying circuit element, of a tuned electrical circuit element in inductive coupling relation with said first named element, said tuned circuit element consisting entirely of a ceramic body having predetermined dimensions and a relatively high dielectric constant, and means for rotating said body to vary the inductive coupling relation thereof with said signal conveying circuit element, thereby to provide variable control of a signal conveying characteristic of said system.

16. In a high frequency signal conveying system, the combination with a tuned signal responsive circuit comprising an inductance element, and a ceramic body having a high dielectric constant having at least one face in inductive coupling relation to said inductive element and dimensioned to resonate at the frequency of said tuned circuit.

ROBERT L. HARVEY.

References Cited in the file of this patent

UNITED STATES PATENTS

| Number | Name | Date |
|---|---|---|
| 1,778,796 | Craig | Oct. 21, 1930 |
| 1,886,815 | Hund | Nov. 8, 1932 |
| 2,283,924 | Harvey | May 26, 1942 |
| 2,354,365 | Crossley | July 25, 1944 |
| 2,540,412 | Adler | Feb. 6, 1951 |

OTHER REFERENCES

Industrial Engineering Chemistry, vol. 38 (1946), pages 1097–1109, article "High Dielectric Constant Ceramics" by von Hippel et al.

The Physical Review, vol. 71, Second Series Number 12, published on June 15, 1947, by the American Institute of Physics, New York. Pages 890–895. (Copy in Patent Office Library.)